(12) United States Patent
Bress et al.

(10) Patent No.: US 11,949,931 B2
(45) Date of Patent: *Apr. 2, 2024

(54) METHODS AND SYSTEMS FOR PREDICTING CONTENT CONSUMPTION

(71) Applicant: COMCAST CABLE COMMUNICATIONS, LLC, Philadelphia, PA (US)

(72) Inventors: Robert Alan Bress, New Providence, NJ (US); Zhao Xing, Philadelphia, PA (US); Christopher Paul Whitely, Summit, NJ (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,800

(22) Filed: Apr. 6, 2022

(65) Prior Publication Data

US 2022/0337895 A1  Oct. 20, 2022

Related U.S. Application Data

(63) Continuation of application No. 16/834,790, filed on Mar. 30, 2020, now Pat. No. 11,323,760.

(51) Int. Cl.
*H04N 21/25* (2011.01)
*H04N 21/254* (2011.01)

(52) U.S. Cl.
CPC ......... *H04N 21/251* (2013.01); *H04N 21/254* (2013.01)

(58) Field of Classification Search
CPC .......................... H04N 21/251; H04N 21/254
See application file for complete search history.

(56) References Cited

U.S. PATENT DOCUMENTS

| | | |
|---|---|---|
| 8,510,770 B1 | 8/2013 | Oztaskent |
| 2009/0025027 A1* | 1/2009 | Craner ............... H04N 21/2385 725/116 |
| 2010/0138298 A1 | 6/2010 | Fitzgerald |
| 2010/0299264 A1 | 11/2010 | Berger |
| 2011/0202962 A1 | 8/2011 | Kanda |
| 2012/0158531 A1 | 6/2012 | Dion |
| 2013/0290999 A1* | 10/2013 | Itakura ............. H04N 21/44222 725/14 |
| 2014/0068654 A1 | 3/2014 | Marlow |
| 2015/0264445 A1 | 9/2015 | Lock |
| 2016/0057490 A1 | 2/2016 | Besehanic |
| 2016/0165287 A1* | 6/2016 | Wood ............... H04N 21/44222 725/14 |
| 2019/0236093 A1 | 8/2019 | Andavarapu |
| 2020/0344521 A1 | 10/2020 | Lee |

\* cited by examiner

*Primary Examiner* — Michael B. Pierorazio
(74) *Attorney, Agent, or Firm* — Ballard Spahr LLP

(57) ABSTRACT

Methods and systems for content optimization are described. A computing device may determine a predictability score that indicates a probability that a device will access a first content item. The computing device may send a second content item associated with the first content item. The second content item may be based on the predictability score, and the predictability score may be modified. Additional content consumption and/or recommendations may be adjusted based on the predictability score.

20 Claims, 7 Drawing Sheets

METHODS AND SYSTEMS FOR PREDICTING CONTENT CONSUMPTION

CROSS REFERENCE TO RELATED APPLICATION

This application is a continuation of U.S. patent application Ser. No. 16/834,790, filed Mar. 30, 2020, the entirety of which is incorporated by reference herein.

BACKGROUND

Viewers of content generally prefer content customized to the viewer. For example, the viewer may prefer receiving a recommendation for another content item based on the viewer's preferences for content. However, providing an accurate recommendation to the viewer is difficult as viewers are likely to watch a variety of content items, which may not have an easily discernible correlation other than the viewer watched them. Further, even if a recommendation is provided to the viewer, historically there has not always been a way to determine if the recommendation was successful or how successful the recommendation was to the viewer.

SUMMARY

It is to be understood that both the following general description and the following detailed description are exemplary and explanatory only and are not restrictive. Methods and systems for content optimization are described. A viewer (e.g., user) may watch (e.g., access, consume, etc.) content via a media device (e.g., a computing device, a set-top-box, etc.). The media device, or another computing device, may determine the content the viewer is watching, as well as one or more characteristics of the content. Based on the viewer's viewing history, a predictability score may be determined. The predictability score may indicate the probability that the viewer will view a new content item that the viewer has not previously watched. The media device may output content (e.g., a recommendation, other content, etc.) related to the new content item to entice the viewer to watch the new content item. If the viewer does watch the new content item, the predictability score may be updated to reflect the fact that the viewer watched the new content. That is, the predictability score may be updated to indicate that the content related to the new content item was successful in enticing the viewer to watch the new content. Similarly, if the viewer does not watch the new content item, the predictability score may be updated to reflect that the content related to the new content item was not successful in enticing the viewer to watch the new content. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
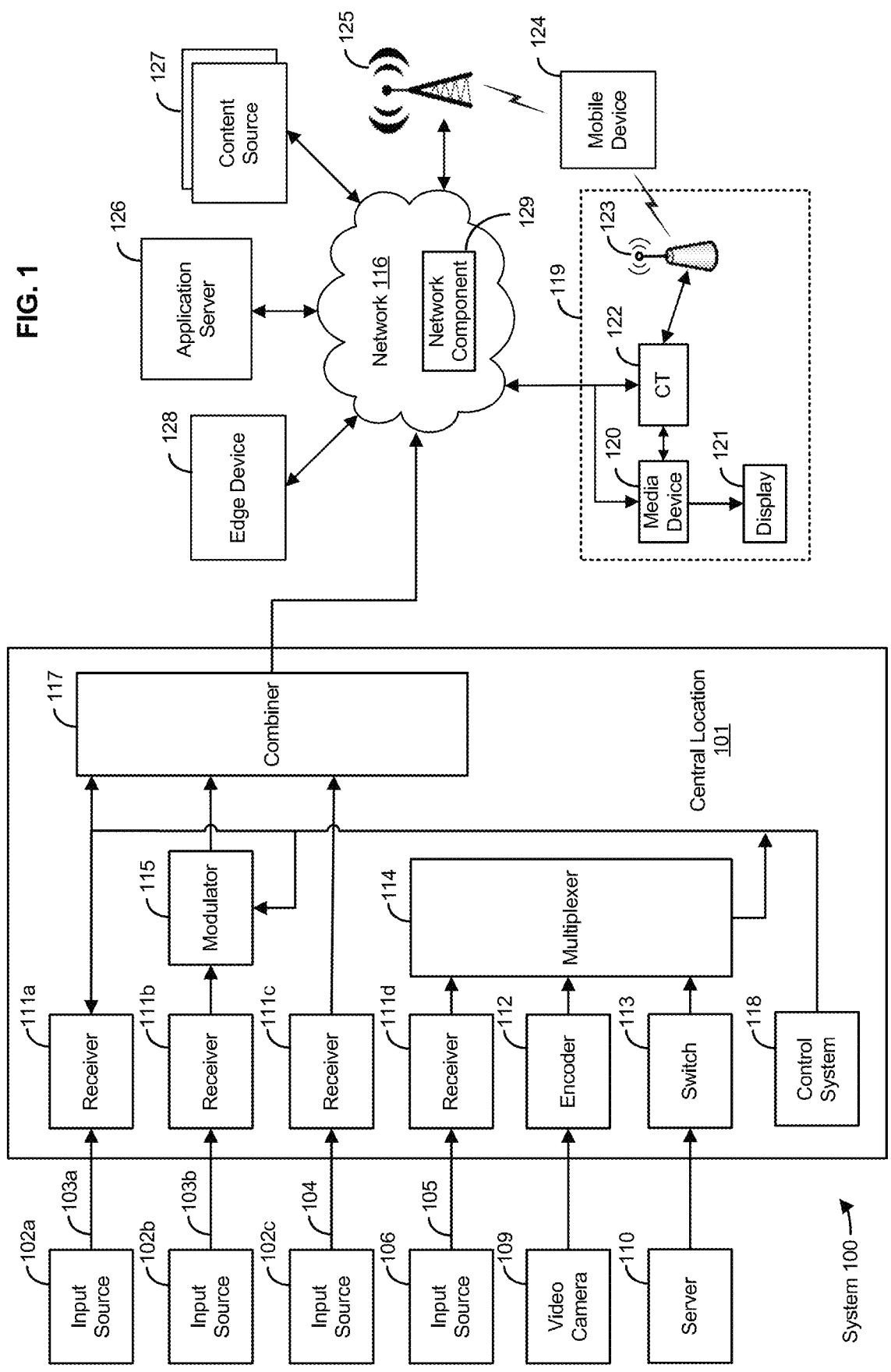
FIG. 1 shows an example system for content optimization.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

Methods and systems are described for content optimization. A computing device (e.g., a media device, a server, etc.) may determine whether a viewer (e.g., a media device associated with the view, a household associated with the viewer, etc.) has watched one or more content items previously. The computing device may determine, based on the viewing history of the viewer, one or more characteristics associated with content items that the viewer views. The computing device may determine (e.g., based on the one or more characteristics associated with the content items, the viewing history of the viewer, etc.) a predictability score that indicates the probability that the viewer will watch a new content item. The computing device may determine the predictability score based on a plurality of different viewers and their respective viewing history.

For example, the viewer of a TV show, such as Ninja Warrior, may prefer content items (e.g., shows, movies, etc.) associated with feats of strength. Thus, the computing device may determine a predictability score (e.g., 0-100%) that indicates the probability that the viewer will watch another content item that involves feats of strength, such as Titan Games. Accordingly, the computing device may determine that the viewer has a high predictability score (e.g., greater than threshold amount such as 70%, 80%, 95%, etc.) to watch the Titan Games based on their enjoyment of Ninja Warrior. The computing device may provide the viewer with an advertisement for the Titan Games based on the high predictability score. The predictability score may take into account a variety of factors when determining whether a viewer will watch new content item, such as a time period between when the advertisement is shown and when the next episode of the Titan games begins, what network the Titan Games is on, a genre, a title, one or more actors, one or more directors, a release date, a viewing date, and so forth.

Additionally, the computing device may determine whether the viewer watched an advertisement associated with a content item to adjust the predictability score. For example, if an advertisement for the Titan Games was shown during an episode of Ninja Warrior, and the viewer ended up watching the Titan Games for the first time after viewing the advertisement, the predictability score may be adjusted (e.g., predictability increased) because the viewer took the step to actually watch the Titan Games, which indicates that the viewer was successfully converted to the Titan Games based on the advertisement.

Each advertisement may be assigned an appraisal score that indicates the value of the advertisement for a given advertisement slot. For example, using the predictability score mentioned above, the impact that the advertisement has on the viewers for the given advertisement slot may be determined. As an example, the appraisal score of the Titan Games advertisement may be higher when shown during an episode of Ninja Warrior because the viewers watching Ninja Warrior may be predicted to have a high likelihood to watch the Titan Games, whereas the appraisal score of the Titan Games advertisement may be lower during a show of Keeping up with the Kardashians. Additionally, the appraisal score may be raised or lowered based on whether viewers of the advertisement later consumed the content that was associated with the advertisement so that the appraisal score reflects the actual conversions rather than simply the number of households that viewed the advertisement.

FIG. 1 shows an example system 100 for content optimization. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may comprise a central location 101 (e.g., a headend), which may receive content (e.g., data, input programming, and the like) from multiple sources. The central location 101 may combine the content from the various sources and may distribute the content to user (e.g., subscriber) locations (e.g., premises 119) via a network 116 (e.g., content distribution and/or access system).

The central location 101 may receive content from a variety of sources 102a, 102b, and 102c. The content may be sent from the source to the central location 101 via a variety of transmission paths, including wireless (e.g., satellite paths 103a, 103b) and a terrestrial path 104. The central location 101 may also receive content from a direct feed source 106 via a direct line 105. Other input sources may be capture devices such as a video camera 109 or a server 110. The signals provided by the content sources may comprise a single content item, a portion of a content item (e.g., content fragment, content portion, content section), a content stream, a plurality of content streams, a multiplex that comprises several content items, and/or the like. The plurality of content streams may comprise different bitrates, framerates, resolutions, codecs, languages, and so forth. The signals provided by the content sources may be video frames and audio frames that comprise metadata. The metadata of the video frames and the audio frames may be used to determine, and correct if necessary, a synchronization error between the video frames and the audio frames.

The central location 101 may be one or a plurality of receivers 111a, 111b, 111c, 111d that are each associated with an input source. MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

Data may be inserted into the content at the central location 101 by a device (e.g., the encoder 112, the multiplexer 114, the modulator 115, and/or the combiner 117). The data may be metadata. The device may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as an MPEG encoder and/or transcoder. The metadata may also be inserted at other stages in a content distribution network such as at a packager, at a cache device associated with the content distribution network, at an input to the client device, or by any device at any point in the content distribution network.

The metadata may indicate one or more characteristics associated with a content item. For example, the metadata may indicate at least one of a genre, a title, a subject, one or more actors, one or more directors, a release date, and/or a viewing date of the content item. The metadata may be utilized to determine a predictability score that indicates the probability that the content item may be output.

The central location 101 may be one or more modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may facilitate delivery of audio content and video content. The audio content may be sent in one or more streams of content. The one or more streams of audio content may comprise different bitrates, framerates, resolutions, codecs, languages, and so forth. The video content may be sent in one or more streams of content. The one or more streams of video content may comprise different bitrates, framerates, resolutions, codecs, languages, and so forth. The audio content may be audio frames, and the video content may be video frames. Additionally, the audio content and the video content may comprise metadata. The metadata may indicate one or more characteristics (e.g., properties) of the audio content and the video content.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a premises 119. The premises 119 may be associated with one or more viewers. For example, the premises 119 may be a viewer's home. A user account may be associated with the premises 119. The signals may be one or more streams of content. The streams of content may be audio content and/or video content. The audio content may comprise a stream separate from the video content. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116 at one or more of the user locations. At the premises 119, a media device 120 may demodulate and/or decode (e.g., determine one or more audio frames and video frames), if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a combination thereof, and/or the like. The media device 120 may comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The media device 120 may receive the content. The media device 120 may cause output of the content. The content may be output to enable one or more viewers (e.g., the viewers of the premises 119) to watch the content. The content may be displayed via the display device 121. The media device 120 may cause output of an advertisement associated with a content item. The media device 120 may determine whether the content item was output after the advertisement was displayed. The media device 120 may send a notification indicating the output content.

The communication terminal 122 may be located at the premises 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOCSIS).

The premises 119 may comprise a first access point 123, such as a wireless access point. The first access point 123 may be configured to provide one or more wireless networks in at least a portion of the premises 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The premises 119 may not be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the premises 119 or remote from premises 119. The second access point 125 may be located along a travel route, within a business or residence, or other useful locations (e.g., travel stop, city center, park).

The system 100 may comprise an application server 126. The application server 126 may provide services related to applications. The application server 126 may comprise an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The application server 126 may determine a viewing history for the premises 119 based on content that a user device (e.g., the media device 120, the communications terminal 122, and/or the mobile device 124) has consumed. For example, the user device may request content from the application server 126, and the content source may provide the user device with the requested content. The application server 126 may store (e.g., in memory) data that indicates the content requested by the user device, as well as determine and store how long the user device consumes (e.g., outputs) the content. For example, the application server 126 may determine a viewing history for the user device.

The application server 126 may utilize the viewing history to make a recommendation or a prediction for a content item that the user device may consume. For example, the application server 126 may determine a predictability score that indicates a probability that the user device will consume a content item that the user device has not previously watched. The application server 126 may determine, based on the viewing history, that the user device regularly requests and watches crime dramas. The application server 126 may determine, based on the user device requesting and watching crime dramas, that the user device may desire to watch a new crime drama that the user device has not previously watched. As an example, the application server 126 may determine a predictability score that satisfies a threshold that indicates that the user device may be likely to consume the new crime drama. The application server 126 may send (e.g., transmit, provide, etc.) a content item associated with the new crime drama to the user device based on the predictability score. For example, the content item associated with the new crime drama may be an advertisement for the new crime drama.

The application server 126 may modify the predictability score based on whether the user device consumed the new crime drama or not. For example, the user device may cause output of the content item at a first time (e.g., a time of a day), and the user device may cause output of the new crime drama at a second time (e.g., a time of a day). The user device may send to the application server 126 an indication of when one or more of the content item or the new crime drama were caused to be output. The application server 126 may determine an amount of time between the first time (e.g., when the content item was output by the user device) and the second time (e.g., when the new crime drama was output by the user device). Thus, the application server 126 may modify the predictability score based on the indication of when one or more of the content item or the new crime drama were caused to be output by the user device and the amount of time. Accordingly, since the user device consumed the new crime drama, then the application server 126 may modify the predictability score to indicate that the predictability score was accurate. As another example, if after sending the content item associated with the new crime drama to the user device and the user device does not consume the new crime drama, then the application server 126 may modify the predictability score to indicate that the predictability score was inaccurate because the user device did not consume the new crime drama. Accordingly, the application server 126 may modify the predictability score depending on whether the predictability score was correct (e.g., that the user device did in fact consume the new crime drama) or incorrect (e.g., that the user device did not in fact consume the new crime drama).

The system 100 may comprise one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The content source 127 may determine a viewing history for the premises 119 based on content that a user device (e.g., the media device 120, the communications terminal 122, and/or the mobile device 124) has consumed. For example, the user device may request content from the content source 127, and the content source may provide the user device with the requested content. The content source 127 may store (e.g., in memory) data that indicates the content requested by the user device, as well as determine and store how long the user device consumes (e.g., outputs) the content. For example, the content source 127 may determine a viewing history for the user device.

The content source 127 may utilize the viewing history to make a recommendation or a prediction for a content item that the user device may consume. For example, the content source 127 may determine a predictability score that indicates a probability that the user device will consume a content item that the user device has not previously watched. The content source 127 may determine, based on the viewing history, that the user device regularly requests and watches crime dramas. The content source 127 may determine, based on the user device requesting and watching crime dramas, that the user device may desire to watch a new crime drama that the user device has not previously watched. As an example, the content source 127 may determine a predictability score that satisfies a threshold that indicates that the user device may be likely to consume the new crime drama. The content source 127 may send (e.g., transmit, provide, etc.) a content item associated with the new crime drama to the user device based on the predictability score. For example, the content item associated with the new crime drama may be an advertisement for the new crime drama.

The content source 127 may modify the predictability score based on whether the user device consumed the new crime drama or not. For example, if after sending the content item associated with the new crime drama to the user device and the user device consumes the new crime drama, then the content source 127 may modify the predictability score to indicate that the predictability score was accurate because the user device did consume the new crime drama. As another example, if after sending the content item associated with the new crime drama to the user device and the user device does not consume the new crime drama, then the content source 127 may modify the predictability score to indicate that the predictability score was inaccurate because the user device did not consume the new crime drama. Accordingly, the content source 127 may modify the predictability score depending on whether the predictability score was correct (e.g., that the user device did in fact consume the new crime drama) or incorrect (e.g., that the user device did not in fact consume the new crime drama).

Data may be inserted into the content at the content source 127. The data may be metadata. The content source 127 may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with content source 127. The metadata may also be inserted at other stages in a content distribution network such as at a packager, at a cache device associated with the content distribution network, at an input to the client device, or by any device at any point along the content distribution. While the content source 127 has been described as providing the audio content and video content, as well as encoding the metadata, for ease of explanation, a person of ordinary skill in the art would appreciate that any device in the system 100 may provide the content as well as encode the metadata such as, the edge device 128, described further below.

The system 100 may comprise an edge device 128. The edge device 128 may be configured to provide content, services, and/or the like to the premises 119. The edge device 128 may be one of a plurality of edge devices distributed across the network 116. The edge device 128 may be located in a region proximate to the premises 119. A request for content from the user may be directed to the edge device 128 (e.g., due to the location of the edge device and/or network conditions). The edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The edge device 128 may cache or otherwise store content (e.g., frequently requested content) to enable faster delivery of content to users.

The edge device 128 may determine a viewing history for the premises 119 based on content that a user device (e.g., the media device 120, the communications terminal 122, and/or the mobile device 124) has consumed. For example, the user device may request content from the edge device 128, and the content source may provide the user device with the requested content. The edge device 128 may store (e.g., in memory) data that indicates the content requested by the user device, as well as determine and store how long the user device consumes (e.g., outputs) the content. For example, the edge device 128 may determine a viewing history for the user device.

The edge device 128 may utilize the viewing history to make a recommendation or a prediction for a content item that the user device may consume. For example, the edge device 128 may determine a predictability score that indicates a probability that the user device will consume a content item that the user device has not previously watched. The edge device 128 may determine, based on the viewing history, that the user device regularly requests and watches crime dramas. The edge device 128 may determine, based on the user device requesting and watching crime dramas, that the user device may desire to watch a new crime drama that the user device has not previously watched. As an example, the edge device 128 may determine a predictability score that satisfies a threshold that indicates that the user device may be likely to consume the new crime drama. The edge device 128 may send (e.g., transmit, provide, etc.) a content item associated with the new crime drama to the user device based on the predictability score. For example, the content item associated with the new crime drama may be an advertisement for the new crime drama.

The edge device 128 may utilize the viewing history to make a recommendation or a prediction for a content item that the user device may consume. For example, the edge device 128 may determine a predictability score that indicates a probability that the user device will consume a content item that the user device has not previously watched. The edge device 128 may determine, based on the viewing history, that the user device regularly requests and watches crime dramas. The edge device 128 may determine, based on the user device requesting and watching crime dramas, that the user device may desire to watch a new crime drama that the user device has not previously watched. As an example, the edge device 128 may determine a predictability score that satisfies a threshold that indicates that the user device may be likely to consume the new crime drama. The edge device 128 may send (e.g., transmit, provide, etc.) a content item associated with the new crime drama to the user device based on the predictability score. For example, the content item associated with the new crime drama may be an advertisement for the new crime drama.

The network 116 may comprise a network component 129. The network component 129 may be any device, module, and/or the like communicatively coupled to the network 116. The network component 129 may also be a router, a switch, a splitter, a packager, a gateway, an encoder, a storage device, a multiplexer, a network access location (e.g., tap), physical link, and/or the like.

Any of the application server 126, the content source 127, the edge device 128, and/or the media device 120 may serve as a server relative to a user device, such as the media device 120, the communication terminal 122, and/or the mobile device 124, and may determine a predictability score that indicates whether a household will access (e.g., consume, output, etc.) a content item. Accordingly, any device within the system 100 may determine whether a household will access (e.g., consume, output, etc.) the content item.

Figure 2:
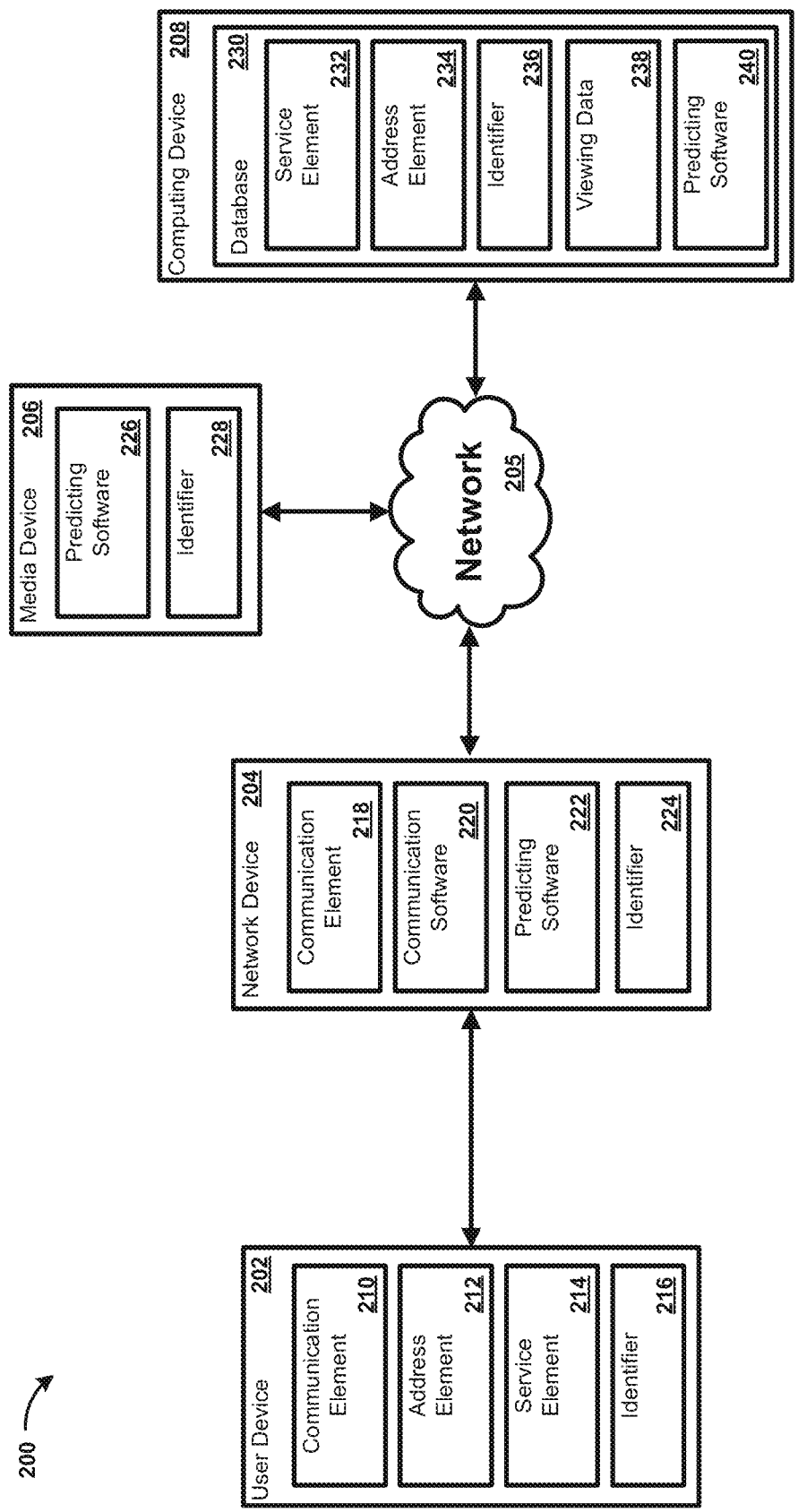
FIG. 2 shows an example system for content optimization

FIG. 2 shows a system 200 for wireless communication. The system 200 may comprise a user device 202 (e.g. the media device 120, the display 121, the communication terminal 122, and/or the mobile device 124 of FIG. 1), a network device 204 (e.g. the media device 120, the communication terminal 122, and/or the network component 129 of FIG. 1), a media device 206 (e.g. the media device 120 and/or the communication terminal 122 of FIG. 1), and a computing device 206 (e.g. the media device 120, the communication terminal 122, the application server 126, the content source 127, the edge device 128, and/or the network component 129 of FIG. 1). The network device 204 may facilitate the connection of a device, such as the user device 202, to a network (e.g., a wireless network).

The user device 202 may comprise a communication element 210, an address element 212, a service element 214, and an identifier 216. The user device 202 may be an electronic device such as a computer, a smartphone, a laptop, a tablet, a set top box, a display device, or other device capable of communicating with the network device 204. The communication element 202 may be a wireless transceiver configured to transmit and receive wireless communications via a wireless network (e.g., Wi-Fi). The communication element 202 may be configured to communicate via one or more wireless networks. The communication element 202 may be configured to communicate via a specific network protocol. The user device 202 may communicate with the network device 204 via the communication element 202.

The user device 202 may comprise an address element 212 and a service element 214. The address element 212 may comprise or provide an internet protocol address, a network address, a media access control (MAC) address, an Internet address, or the like. The address element 212 may be relied upon to establish a communication session between the user device 202 and the network device 204 or other devices and/or networks. The address element 212 may be used as an identifier or locator of the user device 202. The address element 212 may be persistent for a particular network.

The service element 214 may comprise an identification of a service provider associated with the user device 202 and/or with the class of user device 202. The class of the user device 202 may be related to a type of device, capability of device, type of service being provided, and/or a level of service (e.g., business class, service tier, service package, etc.). The service element 214 may comprise information relating to or provided by a communication service provider (e.g., Internet service provider) that may be providing or enabling data flow such as communication services to the user device 202. The service element 214 may comprise information relating to a preferred service provider for one or more particular services relating to the user device 202. The address element 212 may be used to identify or retrieve data from the service element 214, or vice versa. The one or more of the address element 212 and the service element 214 may be stored remotely from the user device 202. Other information may be represented by the service element 214.

The user device 202 may be associated with a user identifier or device identifier 216. The device identifier 216 may be any identifier, token, character, string, or the like, for differentiating one user or computing device (e.g., the computing device 208) from another user or computing device. The device identifier 216 may identify a user or computing device as belonging to a particular class of users or computing devices. The device identifier 216 may comprise information relating to the user device 202 such as a manufacturer, a model or type of device, a service provider associated with the user device 202, a state of the user device 202, a locator, and/or a label or classifier. Other information may be represented by the device identifier 216. The device identifier 216 may be assigned to the user device 202 by the network device 204 and/or the computing device 208.

The network device 204 may comprise a communication element 218, communication software 220, predicting software 222, and an identifier 224. The network device 204 may be configured as a local area network (LAN). The network device 204 may be a wireless communication device. The network device 204 may be a gateway device for communicating with another network, such as a communication network provided by an Internet Service Provider. The network device 204 may be configured with a first service set identifier (SSID) (e.g., associated with a user network or private network) to function as a local network for a particular user or users. The network device 204 may be configured with a second SSID (e.g., associated with a public/community network or a hidden network) to function as a secondary network or redundant network for connected communication devices. The network device 204 may be configured to allow one or more wireless devices to connect to a wired and/or wireless network using Wi-Fi, Bluetooth or any desired method or standard.

The network device 204 may comprise communication software 220. The communication software 220 may be any combination of firmware, software, and/or hardware. The communication software 220 may facilitate the network device 204 communicating with the user device 202 and/or the computing device 208. For example, the network device 204 may facilitate the user device communicating with the network 205. That is, the user device 202 may communicate with the network 205 via the network device 204.

The network device 204 may comprise predicting software 222. The predicting software 222 may be configured to determine a viewing history. The viewing history may be determined based on one or more content items output by a device (e.g., the user device 202, the network device 204, and/or the media device 206). For example, the device may determine the viewing history based on data associated with one or more viewing sessions associated with the device. As an example, the data may indicate a content item, as well as one or more timestamps associated with the content item that indicate when the content item was output by the device (e.g., watched by a user). The data may be stored in a database (e.g., the database 230 of FIG. 2) that may be in communication with the device such that the device may be able to retrieve and/or send data to/from the database.

The predicting software 222 may be configured to determine one or more characteristics based on the viewing history. The predicting software 222 may determine the one or more characteristics based on the viewing history. The one or more characteristics may be associated with one or more content items of the viewing history. That is, the one or more characteristics may be associated with one or more content items that are output by the device. The one or more characteristics may indicate at least one of a genre, a title, a subject, one or more actors, one or more directors, a release date, and/or a viewing date associated with the one or more content items. Each of the one or more content items may have their respective one or more characteristics, as well as characteristics associated with one or more users. The one or more characteristics may comprise a frequency of viewing a content item or one or more related content items. The frequency of viewing the content item or the one or more related content items may comprise a quantity of episodes watched, a quantity of days viewing the content item, as well as a total amount of time spent watching the content item or the one or more related content items. For example, a user may have a history of watching multiple episodes of medical dramas over a short period of time, which may indicate that the user binge watches episodes (e.g., the user consumes, watches, and/or accesses a large quantity of episodes over a relatively small period of time) of medical dramas. Thus, the predicting software 222 may determine that the user enjoys medical dramas due to the high frequency of episodes watched over a period of time.

The predicting software 222 may be configured to determine a predictability score. The predictability score may indicate a probability that the device will cause output of a first content item. The predictability score may be based on the viewing history. The predictability score may be based on the one or more characteristics of the one or more content items output by the device. The predictability score may be based on both the viewing history and the one or more characteristics. For example, the predictability score for a specific household may be based on the content items the specific household watch, as well as an amount of time watching the content items. The one or more characteristics for each of the content items that the specific household watched, as well as how long each of the content items was watched, may be utilized to determine the predictability score, which indicates the likelihood the specific household will watch a content item similar to the content items that the specific household watched.

As an example, a household may watch three content items: content item A, content item B, and content item C. The content item A may be a television show that is a medical drama, and the household has spent a total of 75 hours watching 75 episodes of the content item A. The content item B may be a television show in the horror genre, and the household has spent (15 minutes watching 1 episode of the content item B. The content item C may be a movie that is an action movie, and the household has spent a total of 40 hours watching the movie (20 times.

By utilizing characteristics of the content items A, B, and C, as well as the viewing history of the household of the content items A, B and C, a predictability score may be calculated for a new content item that the household has not watched. For example, the predictability score may be based on a total time spent watching the content items A, B, and C, as well as the time spent watching each of the respective content items A, B, and C. As an example, the total amount of time spent watching the content items is 75 hours watching content item A+0.25 hours watching content item B+40 hours watching content item C=115.25 hours of watched content. The amount of time spent watching a content item that is similar to the new content item may be divided by the total timing watching content to determine a percentage of time spent watching the similar content item. For example, if a content item D is a medical drama, which is similar to the content item A, the time spent watching the content item A may be divided by the total time watched to determine (e.g., 75 hours/115.25 hours) the percentage time watching the content item A (e.g., ~65% of the time watching content). Thus, the household watches the content item A 65% of the total time watching content. Based on the percentage time watching the content item A, the household may enjoy watching the content item D a similar amount of time due to both of the content items A and D being medical dramas. Therefore, the predictability score that indicates the probability that the household watches the content item D may be based off of the determined percentage. Accordingly, the predictability score that the household watches the content item D may be 0.65.

In the aforementioned example, the predictability score is not 100% because other factors, such as characteristics of the content item D, may reduce the confidence in the household watching the content item D. For example, the content item A may be a medical drama associated with a hospital, whereas the content item D may be a medical drama associated with emergency medical services. Thus, even though the content item A and the content item D are both medical dramas, the fact that the content item A is set in a hospital, whereas the content item D is associated with emergency medical services may cause the household to not desire watching the content item D. Accordingly, the predictability score can take into account minor variations between different content items, such as the difference between a setting in a hospital versus a setting associated with emergency services, even though everything else about the content items may be similar.

The predictability score for a content item may also take into account additional content items that are not similar to the content item. For example, returning to the aforementioned example of the content items A, B, C, and D, the household watches the content item C, which is an action movie, approximately 35% of the total time watching content. Thus, the viewing history of the household indicates that the household enjoys watching action movies. Therefore, the predictability score for the content item D may be modified based on the household watching action movies because emergency medical services may provide more action than a hospital setting. Thus, even though content item C is an action movie, the household's viewing history of the content item C may be taken into account to improve the accuracy of the predictability score. As an example, if the predictability score for the content item C is 0.347 (e.g., 40 hours watching content item C/115.25 hours of time spent watching content items=0.347), the predictability score for the content item C may be taken into account when determining the predictability score for the content item D. Thus, the predictability score for the content item C may be added to the content item D. However, the predictability score for the content item C may be weighted based on the different characteristics between the content items C and D. For example, the predictability score of the content item C may be reduced because the content item C is 1) a different type of content item (e.g., movie vs. television show) and 2) a different genre (e.g., action vs. medical drama) than the content item D. As an example, the predictability score for the content item C may be reduced by 30% due to the different types of content items, as well as an additional 10% because the genre is different, which leads to a weighted predictability score for the content item C being 0.1388 (e.g., 0.347*(0.3=0.1)). The weighted predictability score for the content item C may be added to the predictability score for the content item D to determine the predictability score for the content item D. Thus, the predictability score for the content item D may be 0.65+0.1388=0.7888. Accordingly, the predictability score for a new content item may be weighted based on content items previously watched by the household that are similar, as well as non-similar, to the new content item.

The predictability score may be based on one or more other households that have a similar viewing history as the specific household. The predictability score may be based upon the similarity of the specific household to the one or more other households based on the viewing history. The predictability score may indicate a quantity of time (e.g., episodes, hours, minutes, etc.) that the specific household will watch an item of content. A plurality of other households may be identified that have similar viewing histories as the specific household, and based on the plurality of other households viewing histories, one or more content items may be sent (e.g., provided) to the specific household.

As an example, returning to the above example of a first household that has watched content items A, B, and C, with the content item A being a medical drama television show, the content item B being a television show in the horror genre, and the content item C being an action movie; a second household may have watched the content items A and C, as well as an additional content item E. The content item E may be an action thriller television show. The second household may have spent 65 hours watching 50 episodes of the content item A, 10 hours watching the content item C 5 times, and 35 hours watching 70 episodes of the content item E. Based on the similarities between the two households viewing history (e.g., watching habits), the content item E may be identified as an item of content that the first household may want to consume (e.g., watch). Thus, the predictability score for the content item may indicate a likelihood that the first household watches the content item E.

For example, because the amount of time that the first household watched content item A is 75 hours out of an approximate total 115 hours spent watching content, and the second household watched 55 hours of content item A out of an approximate total of 85 hours spent watching content, the predictability score may be based on the time spent watching the content item A over the total time watching content items. Thus, for the first household the ratio may be 75/115=0.65, and for the second household the ratio may be 65/110=0.59. Therefore, by dividing the ratios between the two households re: content item A (0.65/0.59), the predictability score is approximately 1.1 which indicates that the first household will have a similar watching habit for content item E as the second household. Accordingly, the total time spent watching content for the first household may be multiplied by the ratio that the second household watched the content item E to determine how much time the first household may be predicted to watch the content item E. Therefore, the amount of time that the first household may be predicted to watch the content item E may be (the time spent watching content item E by the second household)/ (total time spent watching content by the second household) *(the total amount spent watching content by the first household)*(the ratios between the two households). Thus, the amount of time that the first household may be predicted to watch the content E may be (35 hours spent watching content item E by the second household)/(110 hours of total time spent watching content by the second household)*(115 total hours of content watched by the first household)*(1.1 the ratio of the time spent watching the content item A)=40.22 hours. The determined ratio may be multiplied by the total hours of content watched by the first household to determine how many hours the first household would watch the content item E. Therefore, the first household may be predicted to watch (0.318)*(115)=36.57 hours of content item E. Accordingly, the predictability score may be utilized to determine a quantity of time that a household may watch a content item.

The predicting software 222 may be configured to send a second content item associated with the first content item. The second content item may be an advertisement, an overlay, a recommendation, a preview for a content item, a trailer for a content item, a reminder associated with a content item, and so forth. For example, the second content item may be an advertisement associated with the first content item. The second content item may be sent based on the predictability score. The second content item may be sent based on the predictability score satisfying a threshold. For example, if the predictability is over a certain amount (e.g., greater than 70%, 80%, 95%, etc.), the second content item may be sent. The second content may be associated with the first content. For example, the second content may be an advertisement for the first content.

The predicting software 222 may be configured to modify the predictability score. For example, the device may cause output of the second content item at a first time (e.g., a time of a day), and the device may cause output of the first content item at a second time (e.g., a time of a day). The device may send to the application server 126 an indication of when one or more of the second content item or the first content item were caused to be output. The network device 204 may determine an amount of time between the first time (e.g., when the second content item was output by the device) and the second time (e.g., when the first content item was output by the device). Thus, the network device 204 may modify the predictability score based on the indication of when one or more of the second content item or the first content item were caused to be output by the device and the amount of time. Thus, since the device caused output of the first content item, the predictability score may be modified to indicate a higher probability that the device will cause output of the first content item. That is, because the second content item was output and the device then output the first content, a conversion of the device can be determined since the second content was successfully output. As another example, if the device output the second content item and did not output the first content item, the predictability score may be modified to indicate a lower probability that the device will cause output of the first content item.

Thus, the predictability score may be adjusted to reflect the fact that the conversion was, or was not, successful. For example, if the first content item has a predictability score of 0.8 indicating that the household would likely play the first content item, but the household does not output (e.g., access, play, consume, etc.) the first content item after the output of the second content item, the predictability score can be modified to more accurately indicate the likelihood that the household would output the first content item. As an example, the predictability score may be reduced by 0.2 to indicate that the household is less likely to play the first content item. Thus, the predictability score may be modified to improve the accuracy of the predictability score.

A period of time that the device caused output of the first content item may be determined. The predictability score may be modified based on the period of time satisfying a threshold. For example, if the device causes output of the first content item for longer than a predefined period (e.g., 30 seconds, 1 minute, ½ an episode, more than one episode, etc.), the conversion may be determined as successful and the predictability score may be modified accordingly.

The communication element 218 may be a wireless transceiver configured to transmit and receive wireless communications via a wireless communication. The communication element 218 may be configured to communicate via a specific network protocol. The communication element 218 may be a wireless transceiver configured to communicate via a Wi-Fi network. The network device 204 may communicate with the user device 202 and/or the computing device 208 via the communication element 218.

The network device 204 may comprise an identifier 224. The identifier 224 may be or relate to an Internet Protocol (IP) Address IPV4/IPV6 or a media access control address (MAC address) or the like. The identifier 224 may be a unique identifier for facilitating wired and/or wireless communications with the network device 204. The identifier 224 may be associated with a physical location of the network device 204.

The media device 206 may comprise predicting software 226 and an identifier 228. The media device 206 may be configured to receive content (e.g., via the network 205) and output (e.g., via a display device) the received content. The media device 206 may send data based on the received content and/or the output content. The media device 206 may send the data to the computing device 208 via the network 205. The predicting software 226 incorporates all the capabilities of the predicting software 222. The identifier 228 may be or relate to an Internet Protocol (IP) Address IPV4/IPV6 or a media access control address (MAC address) or the like. The identifier 228 may be a unique identifier for facilitating wired and/or wireless communications with the network device 204. The identifier 228 may be associated with a physical location of the network device 204.

The computing device 208 may comprise a database 230, a service element 232, an address element 234, an identifier 236, viewing data 238, and predicting software 240. The computing device 208 may manage the communication between the user device 202 and a database 230 for sending and receiving data there between. The database 230 may store a plurality of files (e.g., web pages), user identifiers or records, or other information. The user device 202 may request and/or retrieve a file from the database 230. The database 230 may store information relating to the user device 202 such as the address element 212 and/or the service element 212. The computing device 208 may obtain the device identifier 216 from the user device 202 and retrieve information from the database 230. The computing device 208 may assign the identifier 216 to the user device 202. Any information may be stored in and retrieved from the database 230. The database 230 may be disposed remotely from the computing device 208 and accessed via direct or indirect connection. The database 230 may be integrated with the computing device 208 or some other device or system.

The computing device 208 may comprise a service element 232. The service element 232 may comprise an identification of a service provider associated with the computing device 208 and/or with the class of computing device 208. The class of the computing device 208 may be related to a type of device, capability of device, type of service being provided, and/or a level of service (e.g., business class, service tier, service package, etc.). The service element 232 may comprise information relating to or provided by a communication service provider (e.g., Internet service provider) that may be providing or enabling data flow such as communication services to the computing device 208. The service element 232 may comprise information relating to a preferred service provider for one or more particular services relating to the computing device 208. Other information may be represented by the service element 232.

The address element 234 may comprise or provide an internet protocol address, a network address, a media access control (MAC) address, an Internet address, or the like. The address element 234 may be relied upon to establish a communication session between the computing device 208 and the network device 204 or other devices and/or networks. The address element 234 may be used as an identifier or locator of the computing device 208. The address element 234 may be persistent for a particular network.

The computing device 208 may comprise an identifier 236. The identifier 236 may be or relate to an Internet Protocol (IP) Address IPV4/IPV6 or a media access control address (MAC address) or the like. The identifier 236 may be a unique identifier for facilitating wired and/or wireless communications with the network device 204. The identifier 236 may be associated with a physical location of the computing device 208.

The computing device 208 may store viewing data 238 in the database 230. The viewing data 238 may indicate one or more characteristics of the devices. The viewing data 238 may indicate one or more content items accessed (e.g., watched, output, consumed, etc.) by the plurality of devices.

The computing device 208 may utilize the viewing data 238 to determine a predictability score that indicates the probability that a device will output an item of content. The viewing data 238 may indicate a correlation between content items and a user. The viewing data 238 may indicate demographic information of a user. The viewing data 238 may comprise additional data related to the viewing of content items.

The viewing data 238 may be a plurality of vectors associated with a plurality of devices. Each vector may be associated with a specific device. For example, each of the vectors may be a one dimensional vector that indicates an amount of time that each of the devices watched a specific content item. An example of a one dimensional vector is shown in the following chart:

| CONTENT ITEM | TIME (in hours) |
| --- | --- |
| A | 0.5 |
| B | 150 |
| C | 25 |
| D | 5 |

Additionally, a plurality of one dimensional vectors can be combined to make a two dimensional vector, as shown in the following chart:

| CONTENT ITEM | TIME (in hours) Device A | TIME (in hours) Device B | TIME (in hours) Device C |
| --- | --- | --- | --- |
| A | 0.5 | 50 | 12 |
| B | 150 | 2 | 25 |
| C | 25 | 0.1 | 8 |
| D | 5 | 22 | 16 |

Thus, as shown by the chart above, the plurality of one-dimensional vectors can be combined to make a single two dimensional vector. Accordingly, the viewing data 238 may comprise a plurality of vectors associated with a plurality of devices.

The computing device 208 may comprise predicting software 240. The predicting software 240 may be configured to incorporate some or all of the capabilities of the predicting software 222 and/or the predicting software 226. The predicting software 240 may determine one or more characteristics associated with a plurality of devices. The one or more characteristics may be based on viewing data (e.g., the viewing data 238) associated with the plurality of devices. The one or more characteristics associated with each of the plurality of devices may be determined based on viewing data associated with the plurality of devices. For example, each device of the plurality of devices may have a respective viewing history. The one or more characteristics associated with each of the plurality of devices indicates one or more content items that a respective user associated with each of the plurality of devices accesses (e.g., consumes). The one or more characteristics may indicate at least one of a genre, a title, a subject, one or more actors, one or more directors, a release date, and/or a viewing date associated with the one or more content items. The one or more characteristics may be based on viewing data determined by the computing device The predicting software 240 may be configured to determine an available content segment. The available content segment may be associated with a first content item. For example, the available content segment may be an advertisement slot associated with the first content item. The available content segment may be determined to be available based on the available content segment not having an assigned content item to play. For example, the available content segment may be available because an entity (e.g., an advertiser, a content provider, a third party, etc.) has not purchased the available content segment to display an advertisement for the entity. The available content segment may be determined based on a likelihood that the available content segment optimizes the opportunity that a user consumes (e.g., watches, accesses, tunes to, etc.) a specific content item. The likelihood that the available content segment optimizes the opportunity that a household and/or a user accesses and/or consumes a specific content item may be based on one or more factors, such as proximity to a premiere of a content item, a time of day, a network name, a content item name, and so forth. For example, if the household watches each new episode of a television show that airs each Wednesday at 7:00 PM, the household is much more likely to watch an advertisement during the television show than another time. Accordingly, to optimize the opportunity that the household and/or the user accesses and/or consumes the specific content item, an advertisement for the specific content item may be shown at some point during the television show.

The predicting software 240 may rank a plurality of available content segments. The predicting software 240 may rank the available content segments based on a viewer's probability of watching the available content segment. For example, an available content segment may have a higher rank to indicate that the viewer has a higher probability of watching any content presented within the available content segment. As an example, if the available content segment is in the middle of a television show, the viewer may be more likely to watch the available content segment because the viewer may be engrossed by the show. Thus, the predicting software 240 may rank the available content segment higher, as compared to another content segment that is not in the middle of the television show. As another example, the viewer may be more likely to watch the available content segment if the available content segment is right before the beginning of the television show because the viewer may tune into the television show before the show starts to ensure the viewer does not miss any part of the show. Thus, the predicting software 240 may rank the available content segment higher, as compared to another content segment that is not at the beginning of the television show.

The predicting software 240 may rank the plurality of available content segments based on one or more characteristics associated with a content item. The predicting software 240 may determine the characteristics associated with the content item. The characteristics may comprise at least one of a genre, a title, a subject, one or more actors, one or more directors, a release date, scheduled content breaks, plot of the content item, and so forth. The content item may be associated with at least one of the plurality of available content segments. For example, the content item may be a gameshow that has a plurality of available content segments (e.g., advertisement slots), The predicting software 240 may determine, based on the characteristics of the gameshow, a ranking of the available content segments. As an example, the content slot before the final round of play in the gameshow may be ranked higher because most viewer will stay to watch the final round. Accordingly, the predicting software 240 may determine a ranking of the available content segments based on the characteristics of the content item.

The predicting software 240 may rank a plurality of available content items based on one or more characteristics associated with each of the content items. The plurality of available content items may be content items configured for placement within at least one of the available content segments. The predicting software 240 may determine the characteristics associated with the content item. The predicting software 240 may determine the characteristics associated with the content item based on metadata associated with the content item. The characteristics may comprise at least one of a genre, a title, a subject, one or more actors, one or more directors, a release date, scheduled content breaks, plot of the content item, and so forth. For example, the content item may be a sports game that has a plurality of available content segments (e.g., advertisement slots). The predicting software 240 may determine, based on the characteristics of the sports game, a ranking of the available content items. As an example, if one of the available content items is a commercial for a sporting goods store, the predicting software 240 may determine that the commercial for the sporting goods store should be ranked higher than a commercial for clothing store because the demographic that may watch the sports game will be more likely to go to the sporting goods store than the clothing store. Accordingly, the predicting software 240 may determine a ranking of the available content items based on the characteristics of the available content items.

The predicting software 240 may optimize the available content segments and the available content items. The predicting software 240 may determine the optimal combination of an available content segment with an available content item. The predicting software 240 may determine the optimal combination based on a plurality of factors, such as target audience, viewer demographics, geography, viewing history, and so forth in order to optimize the impact of the combination of the available content item and the available content segment. Thus, the predicting software 240 may determine the optimal combination based on one or more characteristics associated with the available content segment, as well as based on one or more characteristics associated with the plurality of available content items.

The predicting software 240 may be configured to determine a respective predictability score for each of the plurality of devices. The respective predictability score may indicate the probability that each device of the plurality of devices will cause output of a second content item. The respective predictability score may be based on the one or more characteristics associated with the first content item. The respective predictability score may be based on the one or more respective characteristics associated with each of the plurality of devices. The predictability score may be determined based on both of the one or more characteristics associated with the first content item and the one or more respective characteristics associated with each of the plurality of devices. For example, a predictability score that indicates the likelihood that a first household may access (e.g., consume) a content item may be based on a second household and a third household. The predictability score may indicate a quantity of episodes that the first household will consume (e.g., watch, access, etc.). The predictability score may indicate how similar two households are on a scale from 0 to 1 and/or 0% to 100%, and the predictability score between the households may be utilized to determine how many episodes of a show the first household may consume. As an example, the number of episodes a household watches may be based on the following equation: [(Predictability Score between the first household and the second household)*(a quantity of episodes of the content item watched by the second household)+(Predictability Score between the first household and the third household)*(a quantity of episodes of the content item watched by the third household)]/[(Predictability Score between the first household and the second household)+(Predictability Score between the first household and the third household)]. As an example, a device may determine a probability that a first household consumes a content item. A second household may have consumed 1 episode of the content item, and a third household may have consumed 10 episodes of the content item. If the predictability score between the first household and the second household is 0.5, and if the predictability score between the first household and the third household is 0.8, the first household would be predicted to watch [(0.5*1)+(0.8*10)]/[(0.5+0.8)] episodes, which equals 10 episodes.

The predicting software 240 may be configured to determine an appraisal score associated with the available content segment. The appraisal score may be based on the respective predictability scores for the plurality of devices. The appraisal score may indicate an appraised value of the available content segment. For example, if the predictability scores for a large portion (e.g., the majority) of the plurality of scores is high, the appraisal score may be comparatively higher because there is a high probability that a content item shown during the available content segment will have a high probability of successfully converting the viewers associated with the plurality of devices. The appraisal score associated with the available content segment may be determined based on a likelihood that the available content segment optimizes the opportunity that a user accesses, (e.g., consumes, watches, tunes to, etc.) a specific content item. The likelihood that the available content segment optimizes the opportunity that a user consumes a specific content item may be based on one or more factors, such as proximity to a premiere of a content item, a time of day, a network name, a content item name, and so forth. As the likelihood that the user consumes a specific content item increases, then the appraisal score may similarly increase to indicate that a value of the available content segment may be increased because the impact of the available content segment on the may be higher. For example, an available content segment before the premiere of a medical drama may be more valuable for another medical drama because the likelihood that the viewers of the medical drama will consume the other medical drama. As another example, an available content segment before the premiere of the medical drama may be less valuable to a sporting event because the viewers of the medical drama may be less likely to consume the sporting event as compared to the other medical drama.

The predicting software 240 may be configured to modify the available content segment. The predicting software 240 may modify the available content segment to indicate a third content item associated with the second content item. The available content segment may be replaced with the third content item. The available content segment may be modified to comprise a marker that indicates that output of the third content segment should be caused based on the marker being processed by one of the plurality of devices. For example, the available content segment may be an advertisement slot, and the available content segment may be modified to comprise the third content item (e.g., an advertisement) or a data stream associated with the available content segment may be modified to indicate (e.g., by adding a placement signal) to a device, such as a set-top-box, that the device needs to request the third content item from a computing device.

The third content may be sent to at least one of the plurality of devices. The third content may be sent by the computing device. The third content may be received by at least one of the plurality of devices. The predicting software 240 may determine whether at least one of the plurality of devices causes output of the second content item. The predicting software 240 may modify the predictability score to indicate a higher probability that the device will cause output of the second content item. The predicting software 240 may determine a period of time that at least one of the plurality of devices caused output of the second content item. The predictability score may be modified based on the period of time satisfying a threshold.

Figure 3:
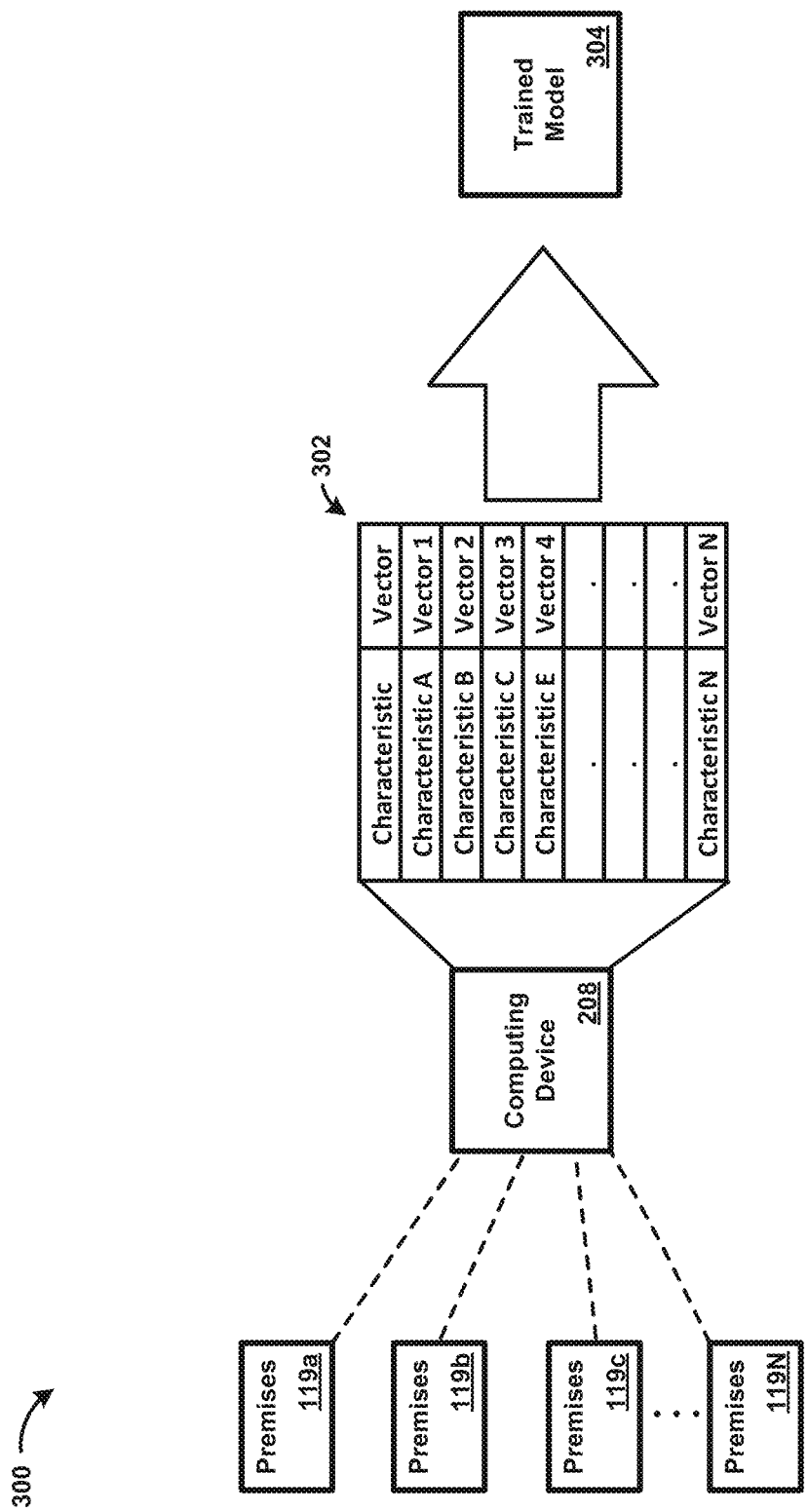
FIG. 3 shows an example system for machine learning.

FIG. 3 shows an example system 300 for machine learning. The system 300 may comprise a plurality of premises 119 that may provide data to the computing device 208. For example, each of the premises 119 may comprise a plurality of devices (e.g., user devices) associated with each of the premises 119. Each of these plurality of devices may be known devices having one or more characteristics and/or labels. That is, the characteristics and/or labels for each of these devices may be known so that a training data set 302 may be created based on one or more characteristics associated with each of the devices. For example, data from each of the plurality of premises 119 may be collected that indicates the content that may be accessed (e.g., output, watched, consumed, etc.). The data may be used to determine a predictability score that indicates a probability that the device may be predicted to watch a second content item based on one or more characteristics of a first content item that the device has watched. The probability may have one or more coefficients associated with the probability. The coefficients may be added to a vector associated with each known device, as well as any characteristics associated with each known device. For example, the characteristics for each known device may be previously determined because these are known devices. Thus, the characteristics are associated with each vector that is associated with the known devices. Accordingly, the training data set 302 has a plurality of characteristics associated with a plurality of vectors for the plurality of known devices. The training data set 302 may be utilized in a first stage of machine learning to produce a trained model 304.

In an aspect, the computing device 208 may provide (e.g., supply, feed, etc.) a machine learning module with data associated with one or more user devices. For example, the computing device 208 may provide (e.g., supply, feed, etc.) the machine learning module with at least a portion of the training data set 302. For example, the computing device 208 may provide the machine learning module with the content (e.g., an identifier of the content) that each of the devices consumes at each of the premises 119. The machine learning module may determine one or more coefficients associated with the devices based on the content that each of the devices consumed content. The coefficients may indicate a probability that the devices are to output a second content item based on a first content item.

The trained model 304 may be a classifier model (e.g., a Support Vector Machine (SVM), a logistic regression, a decision tree, a random forest, a neural network, collaborative filtering, etc.). A separate classifier may be trained for each characteristic to be determined for the content and/or the device. As another example, a unified multi-task classifier (e.g., a multiple layer perceptron with hidden layers and multiple output variables) may be trained to predict all these characteristics and/or labels simultaneously. Any type of classifier may be used (e.g., a neural network with more hidden layers, a linear classifier, a random forest, etc.). Any suitable standard machine learning algorithm may be used. The classifier's parameters may be optimized (e.g., finding parameter values that will give accurate predictions).

After the classifier model is trained to produce the trained model 304, the trained model 304 may classify a new content item (e.g., a second stage of machine learning). The trained model 304 (e.g., a linear regressor or a linear classifier) may determine a predictability score for the new user device and/or the new content based on data associated with the new user device and/or the new content. The trained model 304 may receive as input the vectors and/or data described above, and the characteristic (e.g., output) may indicate one or more characteristics (e.g., labels) of the device and/or the content. For example, a predictability score that indicates the likelihood that a first household may consume a content item may be based on a second household and a third household. The predictability score may indicate a quantity of episodes that the first household will consume, and the quantity of episodes may be based on the following equation: [(Predictability Score between the first household and the second household)*(a quantity of episodes of the content item watched by the second household)+(Predictability Score between the first household and the third household)*(a quantity of episodes of the content item watched by the third household)]/[(Predictability Score between the first household and the second household)+(Predictability Score between the first household and the third household)].

As an example, the trained model 304 may determine a probability that a first household consumes a content item. A second household may have consumed 1 episode of the content item, and a third household may have consumed 10 episodes of the content item. If the predictability score between the first household and the second household is 0.5, and if the predictability score between the first household and the third household is 0.8, the first household would be predicted to watch [(5*1)+(0.8*10)]/[(0.5+0.8)] episodes, which equals 10 episodes.

While the computing device 208 is shown as being separate from the trained model 304, the computing device 208 may comprise the capabilities of the trained model 304. Stated differently, the computing device 208 may be configured to use the machine learning described above.

Figure 4:
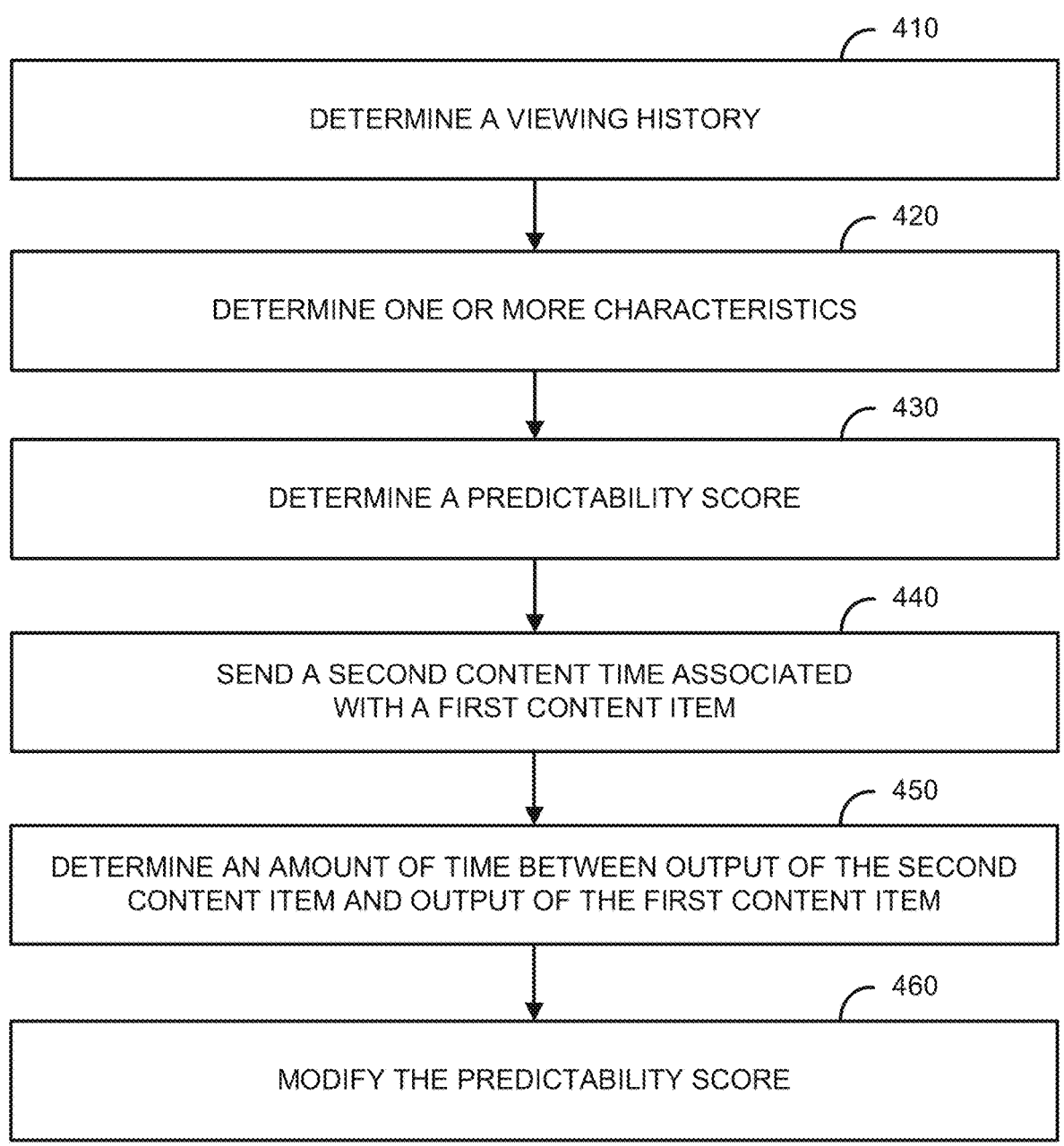
FIG. 4 shows a flowchart of an example method for content optimization.

FIG. 4 shows a flowchart of a method 400 for content optimization. At step 410, a viewing history is determined. The viewing history may be determined by a computing device (e.g., the user device 202, the network device 204, the media device 206, and/or the computing device 208 of FIG. 2). The viewing history may be determined based on one or more content items output by a device (e.g., the user device 202, the network device 204, and/or the media device 206 of FIG. 2).

At step 420, one or more characteristics based on the viewing history may be determined. The computing device may determine the one or more characteristics based on the viewing history. The one or more characteristics may be associated with one or more content items of the viewing history. That is, the one or more characteristics may be associated with one or more content items that are output by the device. The one or more characteristics may indicate at least one of a genre, a title, a subject, one or more actors, one or more directors, a release date, and/or a viewing date associated with the one or more content items. Each of the one or more content items may have their own respective one or more characteristics.

At step 430, a predictability score may be determined. The predictability score may be determined by the computing device using the trained model 304. The predictability score may indicate a probability that the device will cause output of a first content item. The predictability score may be based on the viewing history. The predictability score may be based on the one or more characteristics of the one or more content items output by the device. The predictability score may be based on both the viewing history and the one or more characteristics.

At step 440, a second content item associated with the first content item may be sent. The second content item may be sent by the computing device. The second content item may be sent based on the predictability score. The second content item may be sent based on the predictability score satisfying a threshold. For example, if the predictability is over a certain amount (e.g., greater than 70%, 80%, 95%, etc.), the second content item may be sent. The second content item may be received by the device. The device may cause output of the second content at a first time (e.g., a time of a day). The second content may be associated with the first content. For example, the second content may be an advertisement for the first content. The device may cause output of the first content item at a second time (e.g., a time of a day). The device may send an indication of when one or more of the second content item or the first content item were caused to be output. At step 450, an amount of time may be determined. For example, the amount of time may be determined based on the first time (e.g., when the second content item was output by the device) and the second time (e.g., when the first content item was output by the device).

At step 460, the predictability score may be modified. For example, the predictability score may be modified based on the amount of time between the first time and the second time (e.g., based on the indication of when the device caused output of one or more of the second content item or the first content item). The computing device may modify the predictability score using the trained model 304. For example, since the device caused output of the first content item, the predictability score may be modified to indicate a higher probability that the device will cause output of the first content item. That is, because the second content item was output and the device then output the first content, a conversion of the device can be determined since the second content was successful. Thus, the predictability score may be adjusted to reflect the fact that the conversion was successful. A period of time that the device caused output of the first content item may be determined. The predictability score may be modified based on the period of time satisfying a threshold. For example, if the device causes output of the first content item for longer than a predefined period (e.g., 30 seconds, 1 minute, ½ an episode, more than one episode, etc.), the conversion may be determined as successful and the predictability score may be modified accordingly.

For example, if a first content item has a predictability score of 0.8 indicating that a household would likely play the first content item, but the household does not access (e.g., output, play, consume, etc.) the first content item after the output of the second content item, the predictability score can be modified to more accurately indicate the likelihood that the household would output the first content item. As an example, the predictability score may be reduced by 0.2 to indicate that the household is less likely to play the first content item. Thus, the predictability score may be modified to improve the accuracy of the predictability score. The modified predictability score may be utilized to determine a third content item. For example, the third content item may be determined based on the modified predictability score because the modified predictability score may be a better indicator of what the household would consume. A fourth content item associated with the third content item may be determined. For example, the fourth content item may be an advertisement for the third content item. The fourth content item may be sent to a user device associated with the household.

Figure 5:
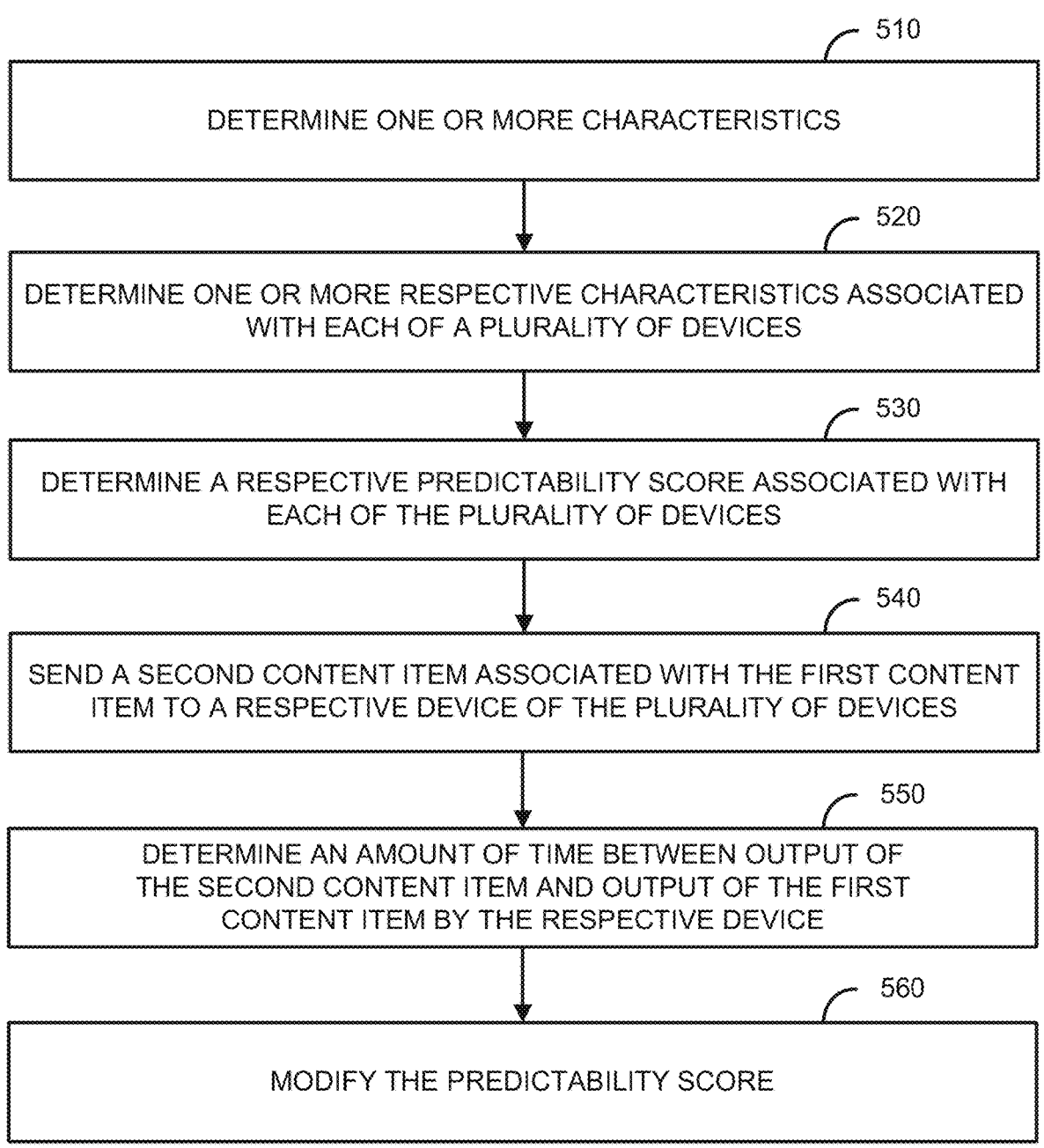
FIG. 5 shows a flowchart of an example method for content optimization.

FIG. 5 shows a flowchart of a method 500 for content optimization. At step 510, one or more characteristics associated with a first content item may be determined. The one or more characteristics may be determined by a computing device (e.g., the user device 202, the network device 204, the media device 206, and/or the computing device 208 of FIG. 2). The one or more characteristics may be based on data associated with the first content item. For example, the first content item may comprise metadata that indicates the one or more characteristics. The one or more characteristics may indicate at least one of a genre, a title, a subject, one or more actors, one or more directors, a release date, and/or a viewing date associated with the one or more content items.

At step 520, one or more characteristics associated with each of a plurality of devices (e.g., the user device 202, the network device 204, and/or the media device 206 of FIG. 2) may be determined. The one or more characteristics associated with each of the plurality of devices may be determined by the computing device. The one or more characteristics associated with each of the plurality of devices may be determined based on viewing data associated with the plurality of devices. For example, each device of the plurality of devices may have a respective viewing history. The one or more characteristics associated with each of the plurality of devices indicates one or more content items that a respective user associated with each of the plurality of devices consumes. The one or more characteristics may indicate at least one of a genre, a title, a subject, one or more actors, one or more directors, a release date, and/or a viewing date associated with the one or more content items. The one or more characteristics may be based on viewing data determined by the computing device.

At step 530, a respective predictability score associated with each of the plurality of devices may be determined. The respective predictability score associated with each of the plurality of devices may be determined by the computing device using the trained model 304. The respective predictability score may indicate the probability that each device of the plurality of devices will cause output of the first content item. The respective predictability score may be based on the one or more characteristics associated with the first content item. The respective predictability score may be based on the one or more respective characteristics associated with each of the plurality of devices. The predictability score may be determined based on both of the one or more characteristics associated with the first content item and the one or more respective characteristics associated with each of the plurality of devices.

At step 540, a second content item associated with the first content item may be sent. The computing device may send the second content item associated with the first content item. The second content item may be an advertisement for the first content item. The first content item may be sent based on at least one of the respective predictability scores satisfying a threshold. For example, if the predictability is over a certain amount (e.g., greater than 70%, 80%, 95%, etc.), the second content item may be sent. The second content item may be received by a respective device that has a respective predictability score that satisfies the threshold. The respective device may cause output of the second content at a first time (e.g., a time of a day). The respective device may cause output of the first content item at a second time (e.g., a time of a day). The respective device may send an indication of when one or more of the second content item or the first content item were caused to be output. At step 550, an amount of time may be determined. For example, the amount of time may be determined based on the first time (e.g., when the second content item was output by the respective device) and the second time (e.g., when the first content item was output by the respective device).

At step 560, the predictability score may be modified. The predictability score may be modified by the computing device using the trained model 304. For example, the predictability score may be modified based on the amount of time between the first time and the second time (e.g., based on the indication of when the respective device caused output of one or more of the second content item or the first content item). For example, since the respective device caused output of the first content item, the predictability score may be modified to indicate a higher probability that the respective device will cause output of the first content item. That is, because the second content item was output and the respective device then output the first content, a conversion of the respective device can be determined since the second content was successful. Thus, the predictability score may be adjusted to reflect the fact that the conversion was successful. A period of time that the respective device caused output of the first content item may be determined. The predictability score may be modified based on the period of time satisfying a threshold. For example, if the respective device causes output of the first content item for longer than a predefined period (e.g., 30 seconds, 1 minute, ½ an episode, more than one episode, etc.), the conversion may be determined as successful and the predictability score may be modified accordingly.

For example, if a first content item has a predictability score of 0.8 indicating that a household would likely play the first content item, but the household does not access (e.g., output, play, consume, etc.) the first content item after the output of the second content item, the predictability score can be modified to more accurately indicate the likelihood that the household would output the first content item. As an example, the predictability score may be reduced by 0.2 to indicate that the household is less likely to play the first content item. Thus, the predictability score may be modified to improve the accuracy of the predictability score. The modified predictability score may be utilized to determine a third content item. For example, the third content item may be determined based on the modified predictability score because the modified predictability score may be a better indicator of what the household would consume. A fourth content item associated with the third content item may be determined. For example, the fourth content item may be an advertisement for the third content item. The fourth content item may be sent to a user device associated with the household.

Figure 6:
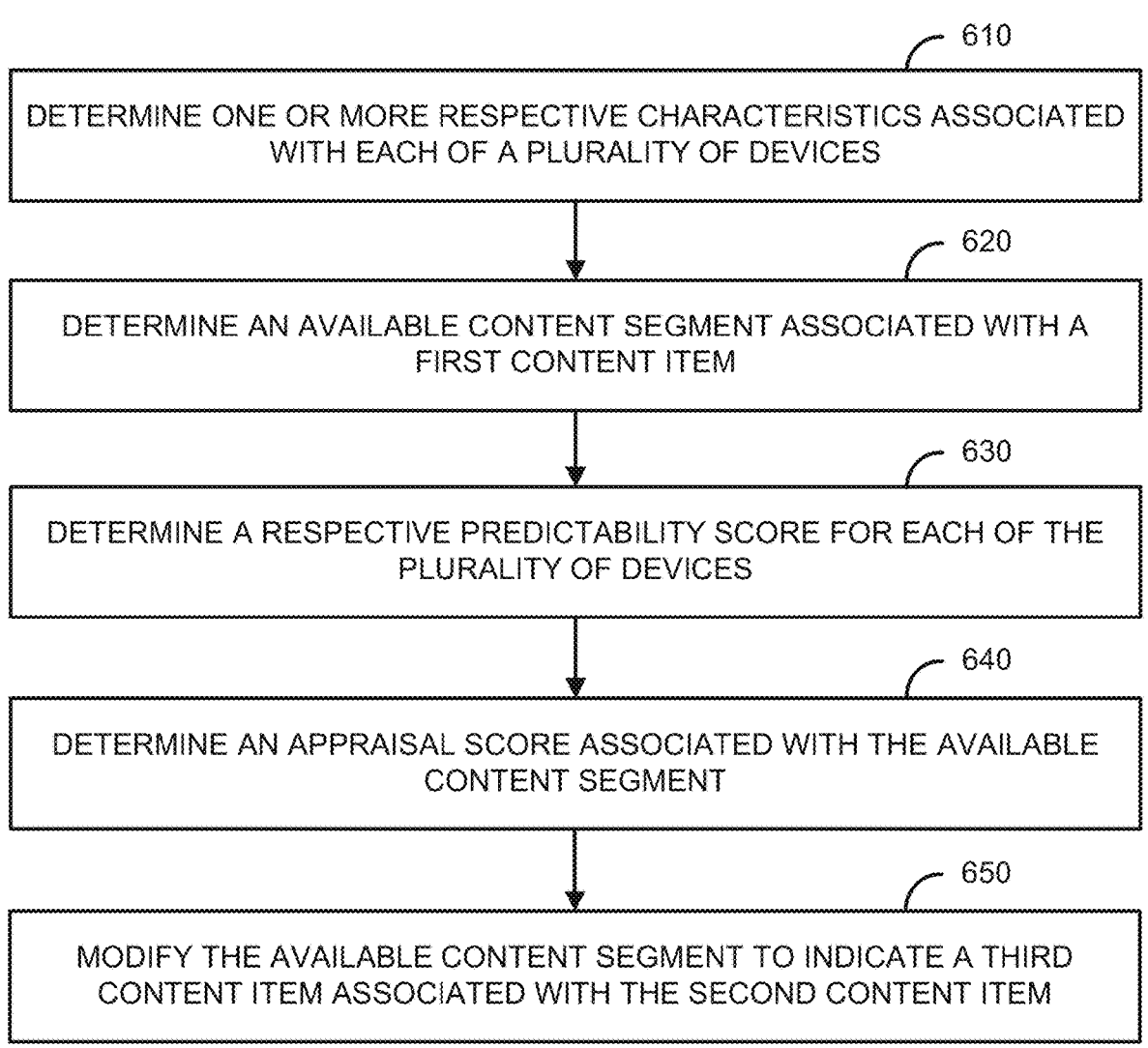
FIG. 6 shows a flowchart of an example method for content optimization.

FIG. 6 shows a flowchart of a method 600 for content optimization. At step 610, one or more characteristics associated with a plurality of devices may be determined. The one or more characteristics may be determined by a computing device (e.g., the user device 202, the network device 204, the media device 206, and/or the computing device 208 of FIG. 2). The one or more characteristics may be based on viewing data associated with the plurality of devices (e.g., the user device 202, the network device 204, and/or the media device 206 of FIG. 2). The one or more characteristics associated with each of the plurality of devices may be determined by the computing device. The one or more characteristics associated with each of the plurality of devices may be determined based on viewing data associated with the plurality of devices. For example, each device of the plurality of devices may have a respective viewing history. The one or more characteristics associated with each of the plurality of devices indicates one or more content items that a respective user associated with each of the plurality of devices consumes. The one or more characteristics may indicate at least one of a genre, a title, a subject, one or more actors, one or more directors, a release date, and/or a viewing date associated with the one or more content items. The one or more characteristics may be based on viewing data determined by the computing device At step 620, an available content segment may be determined. The available content segment may be determined by the computing device. The available content segment may be associated with a first content item. For example, the available content segment may be an advertisement slot associated with the first content item. The available content segment may be determined to be available based on the available content segment not having an assigned content item to play. For example, the available content segment may be available because an entity (e.g., an advertiser, a content provider, a third party, etc.) has not purchased the available content segment to display an advertisement for the entity.

At step 630, a respective predictability score for each of a plurality of devices may be determined. The respective predictability score associated with each of the plurality of devices may be determined by the computing device. The respective predictability score may indicate the probability that each device of the plurality of devices will cause output of a second content item. The respective predictability score may be based on the one or more characteristics associated with the first content item. The respective predictability score may be based on the one or more respective characteristics associated with each of the plurality of devices. The predictability score may be determined based on both of the one or more characteristics associated with the first content item and the one or more respective characteristics associated with each of the plurality of devices.

At step 640, an appraisal score associated with the available content segment may be determined. The appraisal score may be determined by the computing device. The appraisal score may be based on the respective predictability scores for the plurality of devices. The appraisal score may indicate an appraised value of the available content segment. For example, if the predictability scores for a large portion (e.g., the majority) of the plurality of scores is high, the appraisal score may be comparatively higher because there is a high probability that a content item shown during the available content segment will have a high probability of successfully converting the viewers associated with the plurality of devices.

At step 650, the available content segment may be modified to indicate a third content item associated with the second content item. The available content segment may be modified by the computing device. The available content segment may be replaced with the third content item. The available content segment may be modified to comprise a marker that indicates that output of the third content segment should be caused based on the marker being processed by one of the plurality of devices. The third content may be sent to at least one of the plurality of devices. The third content may be sent by the computing device. The third content may be received by at least one of the plurality of devices. The computing device may determine whether at least one of the plurality of devices causes output of the second content item. The computing device may modify the predictability score to indicate a higher probability that the device will cause output of the second content item. The computing device may determine a period of time that at least one of the plurality of devices caused output of the second content item. The predictability score may be modified based on the period of time satisfying a threshold.

For example, if a first content item has a predictability score of 0.8 indicating that a household would likely play the first content item, but the household does not access (e.g., output play, consume, etc.) the first content item after the output of the second content item, the predictability score can be modified to more accurately indicate the likelihood that the household would output the first content item. As an example, the predictability score may be reduced by 0.2 to indicate that the household is less likely to play the first content item. Thus, the predictability score may be modified to improve the accuracy of the predictability score. The modified predictability score may be utilized to determine a third content item. For example, the third content item may be determined based on the modified predictability score because the modified predictability score may be a better indicator of what the household would consume. A fourth content item associated with the third content item may be determined. For example, the fourth content item may be an advertisement for the third content item. The fourth content item may be sent to a user device associated with the household.

Figure 7:
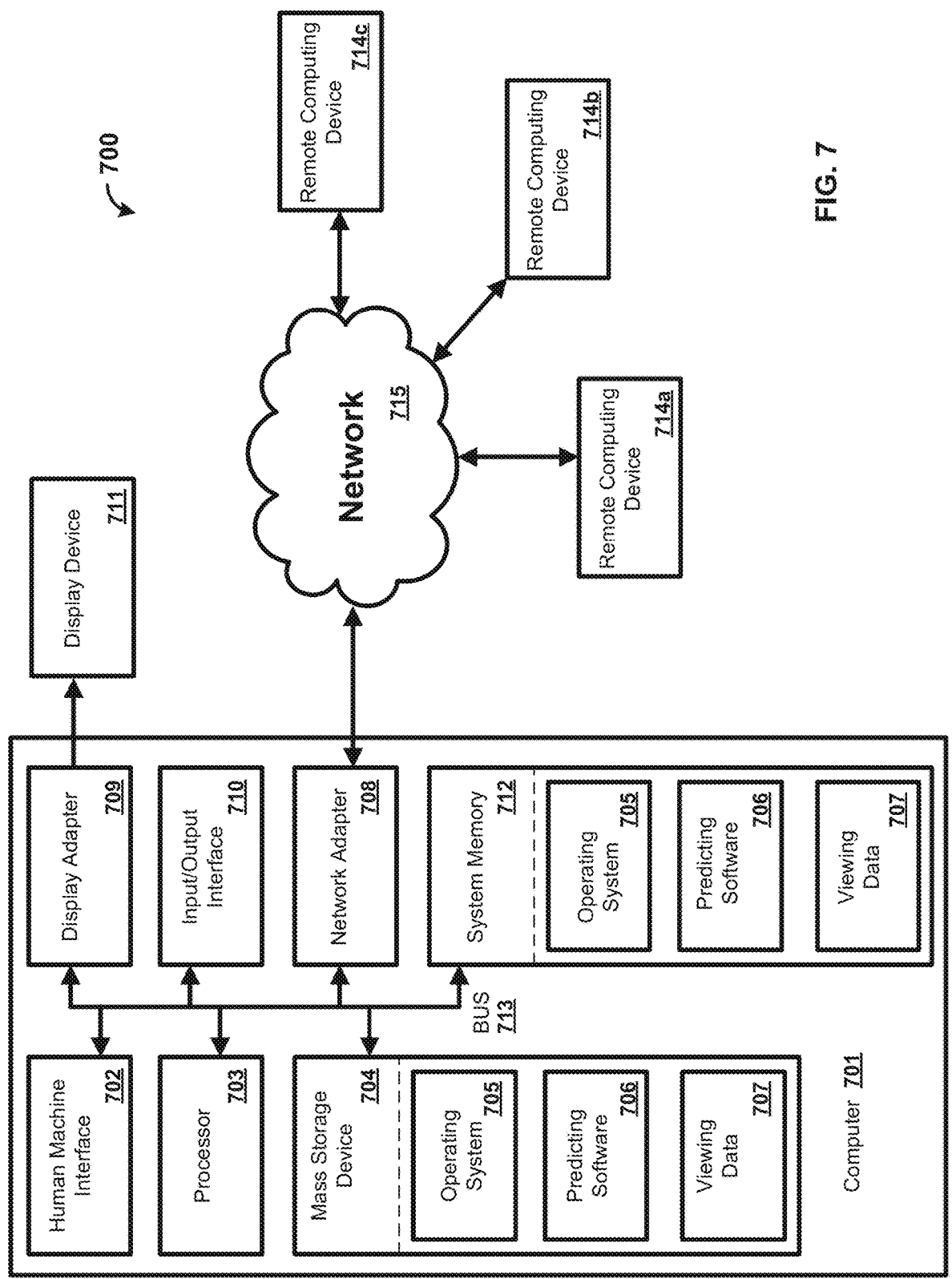
FIG. 7 shows an example block diagram of a computing device for content optimization.

FIG. 7 shows a system 700 for content optimization. The media device 120, the display device 121, the communication terminal 122, the mobile device 124, the application server 126, the content source 127, the edge device 128, and/or the network component 129 of FIG. 1 may be a computer 701 as shown in FIG. 7. The user device 202, the network device 204, the media device 206, and/or the computing device 208 of FIG. 2 may be a computer 701 as shown in FIG. 7. The computer 701 may comprise one or more processors 703, a system memory 712, and a bus 713 that couples various system components including the one or more processors 703 to the system memory 712. In the case of multiple processors 703, the computer 701 may utilize parallel computing. The bus 713 is one or more of several possible types of bus structures, including a memory bus or memory controller, a peripheral bus, an accelerated graphics port, or local bus using any of a variety of bus architectures.

The computer 701 may operate on and/or comprise a variety of computer readable media (e.g., non-transitory). The readable media may be any available media that is accessible by the computer 701 and may comprise both volatile and non-volatile media, removable and non-removable media. The system memory 712 has computer readable media in the form of volatile memory, such as random access memory (RAM), and/or non-volatile memory, such as read only memory (ROM). The system memory 712 may store data such as the viewing data 707 and/or program modules such as the operating system 705 and the predicting software 706 that are accessible to and/or are operated on by the one or more processors 703. The machine learning module may comprise one or more of the viewing data 707 and/or the predicting software 706.

The computer 701 may also comprise other removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 704, such as the operating system 705 and the predicting software 706. Each of the operating system 705 and the predicting software 706 (or some combination thereof) may comprise elements of the program modules and the predicting software 706. The viewing data 707 may also be stored on the mass storage device 704. The viewing data 707 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 715.

A user may enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

The display device 711 may also be connected to the bus 713 via an interface, such as the display adapter 709. It is contemplated that the computer 701 may comprise more than one display adapter 709 and the computer 701 may comprise more than one display device 711. The display device 711 may be a monitor, an LCD (Liquid Crystal Display), light emitting diode (LED) display, television, smart lens, smart glass, and/or a projector. In addition to the display device 711, other output peripheral devices may be components such as speakers (not shown) and a printer (not shown) which may be connected to the computer 701 via the Input/Output Interface 710. Any step and/or result of the methods may be output (or caused to be output) in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 701 and a remote computing device 714*a,b,c* may be made via a network 715, such as a local area network (LAN) and/or a general wide area network (WAN). Such network connections may be through the network adapter 708. The network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the predicting software 706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method, comprising:
    determining one or more characteristics associated with one or more content items accessed via a device;
    determining, based on the one or more characteristics, a predictability score associated with a first content item;
    sending, based on the predictability score, a second content item associated with the first content item; and
    modifying, based on the device accessing the first content item, the predictability score.

2. The method of claim 1, wherein the predictability score indicates a probability that the device will access the first content item and wherein the predictability score is determined using a trained machine learning model, and wherein the predictability score is modified to indicate a higher probability that the device will access the first content item.

3. The method of claim 1, further modifying the predictability score comprises determining a period of time between sending the second content item and accessing the first content item.

4. The method of claim 1, wherein the second content item comprises an advertisement for the first content item, and wherein the one or more characteristics indicate at least one of a genre, a title, a subject, one or more actors, one or more directors, a release date, or a viewing date.

5. The method of claim 1, further comprising:
    determining, based on the modified predictability score, a third content item associated with a fourth content item, wherein the third content item comprises an advertisement for the fourth content item, and
    sending the third content item associated with the fourth content item.

6. The method of claim 1, further comprising:
    determining, based on viewing data associated with the device, one or more characteristics associated with the device; and
    determining, based on one or more characteristics associated with the first content item and based on the one or more characteristics associated with the device, a predictability score for the device, wherein the predictability score indicates a probability that the device will access the first content item.

7. The method of claim 6, further comprising:
    determining an available content segment associated with the first content item;
    determining, based on the a predictability score, an appraisal score associated with the available content segment; and
    modifying, based on the appraisal score satisfying an appraisal score threshold, the available content segment to indicate the second content item associated with the first content item.

8. A method, comprising:
    determining one or more characteristics associated with a first content item;
    determining one or more characteristics associated with one or more devices;
    determining, based on the one or more characteristics associated with the first content item and the one or more characteristics associated with the one or more devices, a predictability score for each device of the one or more devices;
    based on at least one predictability score satisfying a threshold, sending a second content item associated with the first content item to a device of the one or more devices; and
    modifying, based on device accessing the first content item, the predictability score.

9. The method of claim 8, wherein the predictability score indicates a probability that the device will access the first content item and wherein the predictability score is determined using a trained machine learning model, and wherein the predictability score is modified to indicate a higher probability that the device will access the first content item.

10. The method of claim 8, further comprising determining a period of time that the device accessed the first content item.

11. The method of claim 8, wherein the second content item comprises an advertisement for the first content item, and wherein the one or more characteristics associated with the first content item indicate at least one of a genre, a title, a subject, one or more actors, one or more directors, a release date, or a viewing date.

12. The method of claim 8, further comprising:
    determining, based on the modified predictability score, a third content item associated with a fourth content item, wherein the third content item comprises an advertisement for the fourth content item, and sending the third content item associated with the fourth content item.

13. The method of claim 8, further comprising determining, based on one or more content items accessed by each of the one or more devices, a viewing history.

14. The method of claim 8, further comprising:
determining an available content segment associated with the first content item;
determining, based on the predictability score for each device of the one or more devices, an appraisal score associated with the available content segment; and
modifying, based on the appraisal score satisfying an appraisal score threshold, the available content segment to indicate the second content item associated with the first content item.

15. A method, comprising:
determining one or more characteristics associated with one or more devices;
determining an available content segment associated with a first content item;
determining, based on one or more characteristics associated with the first content item and based on the one or more characteristics associated with each of the one or more devices, one or more predictability scores associated with the one or more devices, wherein the each predictability score of the one or more predictability scores indicates a probability that each device of the one or more devices will access a second content item;
determining, based on the one or more predictability scores for the one or more devices, an appraisal score associated with the available content segment; and
modifying, based on the appraisal score satisfying a threshold, the available content segment to indicate a third content item associated with the second content item.

16. The method of claim 15, wherein the each predictability score indicates a probability that a device will access the first content item and wherein each predictability score is determined using a trained machine learning model, and wherein each predictability score is modified to indicate a higher probability that the device will access the first content item.

17. The method of claim 15, further comprising sending, to a device of the one or more devices, the third content item associated with the second content item, wherein the appraisal score indicates an appraised value of the available content segment.

18. The method of claim 17, further comprising determining that the device of the one or more devices accessed the second content item, wherein a predictability score is modified to indicate a higher probability that the device will access the second content item.

19. The method of claim 15, wherein modifying the available content segment to indicate the third content item comprises inserting an advertisement into the available content segment or inserting a placement signal into the available content segment, wherein the one or more characteristics associated with the first content item indicate at least one of a genre, a title, a subject, one or more actors, one or more directors, a release date, or a viewing date.

20. The method of claim 15, further comprising determining, based on one or more content items accessed by each of the one or more devices, a viewing history.

* * * * *